United States Patent
Sato et al.

(10) Patent No.: US 7,184,035 B2
(45) Date of Patent: Feb. 27, 2007

(54) IMAGE DISPLAY SYSTEM AND DISPLAY DEVICE

(75) Inventors: Yuji Sato, Tenri (JP); Akihiko Inoue, Kyoto (JP); Tomoyuki Ishihara, Nara (JP); Toshihisa Nakano, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 989 days.

(21) Appl. No.: 09/878,193

(22) Filed: Jun. 12, 2001

(65) Prior Publication Data

US 2001/0050659 A1  Dec. 13, 2001

(30) Foreign Application Priority Data

Jun. 12, 2000 (JP) .............................. 2000-176181
Apr. 20, 2001 (JP) .............................. 2001-123658

(51) Int. Cl.
G09G 5/00 (2006.01)
G06F 1/00 (2006.01)
G06F 1/26 (2006.01)

(52) U.S. Cl. ........................ 345/213; 713/320; 713/340

(58) Field of Classification Search ................ 345/204, 345/211, 213; 713/320, 340; 348/500
See application file for complete search history.

(56) References Cited

U.S. PATENT DOCUMENTS 5,375,245 A * 12/1994 Solhjell et al. ............. 713/320
5,576,738 A * 11/1996 Anwyl et al. ................ 345/212
5,648,799 A * 7/1997 Kikinis ........................ 345/212
5,754,870 A * 5/1998 Pollard et al. ............... 713/323
5,910,806 A * 6/1999 Narui et al. .................. 345/536
5,917,479 A * 6/1999 Haapakoski ................. 345/211
5,987,614 A * 11/1999 Mitchell et al. ............. 713/300
6,006,335 A * 12/1999 Choi et al. ................... 713/310
6,121,962 A * 9/2000 Hwang ......................... 345/211
6,131,128 A * 10/2000 Lee .............................. 710/5
6,233,689 B1 * 5/2001 Allen et al. .................. 713/320
6,317,841 B1 * 11/2001 Nagae et al. ................ 713/322
6,369,784 B1 * 4/2002 Maslennikov et al. ..... 345/75.2
6,404,423 B1 * 6/2002 Kivela et al. ................ 345/212
6,473,078 B1 * 10/2002 Ikonen et al. ............... 345/211
6,510,525 B1 * 1/2003 Nookala et al. ............ 713/324
6,559,838 B1 * 5/2003 Lonoce et al. .............. 345/212
6,836,824 B1 * 12/2004 Mirov et al. ................ 711/118

FOREIGN PATENT DOCUMENTS

JP  A8101657  4/1996

* cited by examiner

Primary Examiner—Richard Hjerpe
Assistant Examiner—M. Fatahiyar
(74) Attorney, Agent, or Firm—Birch, Stewart, Kolasch & Birch, LLP

(57) ABSTRACT

An image display system includes at least one display device connected to a host device. An image is displayed on the at least one display device in accordance with an image signal which is output from the host device. The at least one display device monitors a state of coupling with the host device.

21 Claims, 7 Drawing Sheets

IMAGE DISPLAY SYSTEM AND DISPLAY DEVICE

BACKGROUND OF THE INVENTION

1. Field of the Invention

The present invention relates to an image display system and a display device, where the display device is coupled to a host device such that an image is displayed on the display device in accordance with an image signal which is output from the host device.

2. Description of the Related Art

Display devices which display images on a display in accordance with access signals (a video signal, a synchronization signal, etc.) which are regularly transmitted from a host device are known.

Such a display device maintains a so-called one-to-one "master-slave" relationship with a host device, where the host device is the master and the display device is the slave. In order to transfer images to a display device from a personal computer serving as a host device, one graphic controller (chip) is usually required for each display device as an interface with the host device.

In recent years, display systems have been proposed in which a personal computer serving as a host device is interconnected with a plurality of display devices. Such display devices maintain a one-to-many "master-slave" relationship with a host device, where the host device is the master and the display devices are the slaves. In such cases, it may be possible to provide in the personal computer a plurality of driving mechanisms for driving the display devices so that each display device is controlled by the personal computer.

However, it is often the case with usual interfaces that, as the number of display devices to be coupled increases, the system power and/or the graphic controller power decrease so that it becomes difficult to obtain a sufficient image displaying function.

In order to overcome the problem of inadequate graphic controller power, a method has been proposed which involves providing a memory in each one of a plurality of display devices which are coupled to a personal computer, and compromising (i.e., slowing down) the speed of transfer to a technically possible transfer rate. For example, during normal operation of displaying moving pictures on the display devices, display is performed while retaining (i.e., writing and reading) in a frame memory of each display device a video signal which is synchronized with a synchronization signal transmitted from the personal computer. When the transmission of the synchronization signal is interrupted, the writing to the frame memory is stopped, and display is performed while reading the information which is retained in the frame memory.

Next, power management of the aforementioned display systems will be discussed.

Power management f or conventional display devices is performed as follows. In the case where a one-to-one "master-slave" relationship exists between a host device and a display device, and the "slave" or the display device is to be turned OFF, the display device detects the presence or absence of a synchronization signal from the "master" or the host device. If it is determined that a synchronization signal is not being transmitted, the display device turns itself OFF. This conventional example will be described with reference to FIG. 3.

FIG. 3 is a block diagram illustrating a conventional image display system. This image display system includes a display controller section 1 as a host device (e.g., a personal computer), which drives a display section 2 implemented by using a display device such as a liquid crystal display (LCD).

The display controller section 1 includes a display control circuit 5, which is connected via a system bus 6 to a host system (not shown) that executes various applications. The display control circuit 5 is connected to a graphic memory 3 via a graphic memory bus 4. The display control circuit 5 is also connected to an image processing circuit 8 and a synchronization circuit 13 in the display section 2 via an interface bus 7. The image processing circuit 8 sends image data to a display circuit 12 via an image data bus 21. The synchronization circuit 13 sends a synchronization signal 14 to the display circuit 12.

FIG. 4 shows various signals which are sent through the interface bus 7. In FIG. 4, an image signal conveys information containing a video signal component; a data-enable signal is a signal which indicates an enabled period of the image signal; a synchronization signal is a signal which indicates the refresh timing for the image signal; and a data transfer clock is a sampling clock signal for transferring the image signal, the data-enable signal, and the synchronization signal.

Next, a flow of image data in the above image display system will be described.

The image signal which is transmitted from the host system (not shown) is first processed by the display control circuit 5 and the graphic memory 3 in the display controller section 1 serving as a host device, and thereafter is transmitted via the interface bus 7 to the image processing circuit 8 and the synchronization circuit 13 in the display section 2 along with the data-enable signal, the synchronization signal, and the data transfer clock signal. The signals which are transmitted through the interface bus 7 may have been subjected to analog and/or digital processing (such as multiplexing or compression) in accordance with the specification of any signal media used. The image processing circuit 8 processes the incoming data, and transmits an image component of the image signal to the display circuit 12. The synchronization circuit 13 processes the incoming data, and transmits the synchronization signal 14 to the display circuit 12. The display circuit 12 displays an image in accordance with the received image component of the image signal and the synchronization signal.

Next, power management for the display section 2 in the above image display system will be described. In the case where the host system (not shown) and the display controller section 1 are turned OFF, or where the display controller section 1 is in a sleep state, the transmission of the synchronization signal from the display controller section is stopped. The synchronization circuit 13 in the display section 2 detects the presence or absence of the synchronization signal from the display controller section 1 via the interface bus 7. Upon determining that a synchronization signal is not being transmitted, the display section 2 turns itself OFF.

However, there is a problem in that the aforementioned power management method for a display system including a host device and a display device under a one-to-one "master-slave" relationship (i.e., the display device detects the presence or absence of a synchronization signal from the "master" or the host device and turns itself OFF upon determining that a synchronization signal is not being transmitted) cannot be effectively used in a display system including a host device and a plurality of display devices under a one-to-many "master-slave" relationship, where display is performed while reading the information which is retained in a frame memory when the transmission of the synchronization signal is interrupted, during which time writing to the frame memory is stopped because it is impossible for each display device to administer its own power management.

The reason is that, in a display system including a host device and a plurality of display devices under a one-to-many "master-slave" relationship, the absence of a synchronization signal transmitted from a host device (which serves as a determination criterion in the conventional power management method for a display system under a one-to-one "master-slave" relationship) will be used not only as a marker for determining whether or not to allow the display device to turn itself off, but also as a marker for determining whether or not to switch to the mode of reading the information retained in a frame memory.

SUMMARY OF THE INVENTION

According to the present invention, there is provided an image display system comprising at least one display device connected to a host device, wherein: an image is displayed on the at least one display device in accordance with an image signal which is output from the host device; and the at least one display device monitors a state of coupling with the host device.

Thus, it is possible to distinguish the "OFF state of a host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

In one embodiment of the invention, the at least one display device monitors the state of coupling with the host device based on a supply voltage level of the host device.

Thus, by monitoring the supply voltage level of a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

In another embodiment of the invention, the at least one display device comprises a plurality of display devices, the plurality of display devices being interconnected to one another; and each of the plurality of display devices monitors a state of coupling with at least one of the other display devices.

Thus, since each display device monitors the state of coupling with another display device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

Alternatively, there is provided according to the present invention an image display system comprising at least one display device connected to a host device, wherein: an image is displayed on the at least one display device in accordance with an image signal which is output from the host device; and the at least one display device determines a state of coupling with the host device based on a data-enable signal which is output from the host device.

Thus, by monitoring a data-enable signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

The aforementioned effect can be obtained by utilizing a data-enable signal which may already be employed in the system, with a host device which can be implemented by using conventional equipment alone, without having to provide any additional interfacing means for monitoring the coupling between a host and the display sections. As a result, any increase in the overhead associated with the interfacing means with the host device is prevented even when a plurality of monitor displays are connected to equipment which has otherwise been dedicated to a single monitor display.

Alternatively, there is provided according to the present invention an image display system comprising at least one display device connected to a host device, wherein: an image is displayed on the at least one display device in accordance with an image signal which is output from the host device; and the at least one display device determines a state of coupling with the host device based on a data transfer clock signal which is output from the host device.

Thus, by monitoring a data transfer clock signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

The aforementioned effect can be obtained by utilizing a data transfer clock signal which may already be employed in the system, with a host device which can be implemented by using conventional equipment alone, without having to provide any additional interfacing means for monitoring the coupling between a host and the display sections. As a result, any increase in the overhead associated with the interfacing means with the host device is prevented even when a plurality of monitor displays are connected to equipment which has otherwise been dedicated to a single monitor display.

In still another embodiment of the invention, the state of coupling with the host device is constantly monitored.

Thus, by constantly monitoring a data-enable signal or a data transfer clock signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

In still another embodiment of the invention, the state of coupling with the host device is monitored during a period which is set by means of a timer.

Thus, by monitoring a data-enable signal or a data transfer clock signal which is output from a host device during a period which is set by means of a timer, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can administer its own power management.

In another aspect of the present invention, there is provided a display device connected to a host device, the display device displaying an image in accordance with an image signal which is output from the host device, wherein the display device monitors a state of coupling with the host device.

Thus, it is possible to distinguish the "OFF state of a host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, a display device can be realized which can administer its own power management.

In yet another aspect of the present invention, there is provided a display device for use in an image display system comprising at least one display device connected to a host device, wherein an image is displayed on the display device in accordance with an image signal which is output from the host device, wherein the display device determines a state of coupling with the host device based on a data-enable signal which is output from the host device.

Thus, by monitoring a data-enable signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, a display device can be realized which can administer its own power management.

The aforementioned effect can be obtained with a host device which can be implemented by using conventional equipment alone. As a result, any increase in the overhead associated with the interfacing means with the host device is prevented even when a plurality of monitor displays are connected to equipment which has otherwise been dedicated to a single monitor display.

Alternatively, there is provided according to the present invention a display device for use in an image display system comprising at least one display device connected to a host device, wherein an image is displayed on the display device in accordance with an image signal which is output from the host device, wherein the display device determines a state of coupling with the host device based on a data transfer clock signal which is output from the host device.

Thus, by monitoring a data transfer clock signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, a display device can be realized which can administer its own power management.

The aforementioned effect can be obtained with a host device which can be implemented by using conventional equipment alone. As a result, any increase in the overhead associated with the interfacing means with the host device is prevented even when a plurality of monitor displays are connected to equipment which has otherwise been dedicated to a single monitor display.

In still another embodiment of the invention, when the coupling with the host device is cancelled, each of the at least one display device independently administers power management thereof based on a prescribed setting.

Thus, by monitoring a data-enable signal or a data transfer clock signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, an image display system can be realized in which each display device can independently administer its own power management.

In still another embodiment of the invention, when the coupling with the host device is cancelled, the display device independently administers power management thereof based on a prescribed setting.

Thus, by monitoring a data-enable signal or a data transfer clock signal which is output from a host device, it is possible to distinguish the "OFF state of the host device" from the "absence of a synchronization signal from the host device" even if the display device is of a type which usually performs display while retaining (i.e., writing and reading) in a frame memory of each display device a video signal which is synchronized with a synchronization signal transmitted from the host device, and which stops writing to the frame memory thereof and instead continues displaying while reading the information which is retained in the frame memory when the transmission of the synchronization signal is interrupted. As a result, a display device can be realized which can independently administer its own power management.

Thus, the invention described herein makes possible the advantages of (1) providing an image display system in which each of a plurality of display devices which are connected to a host device can administer its own power management; and (2) providing a display device to be used for such an image display system.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples, with reference to the accompanying figures.

EXAMPLE 1

Figure 1:
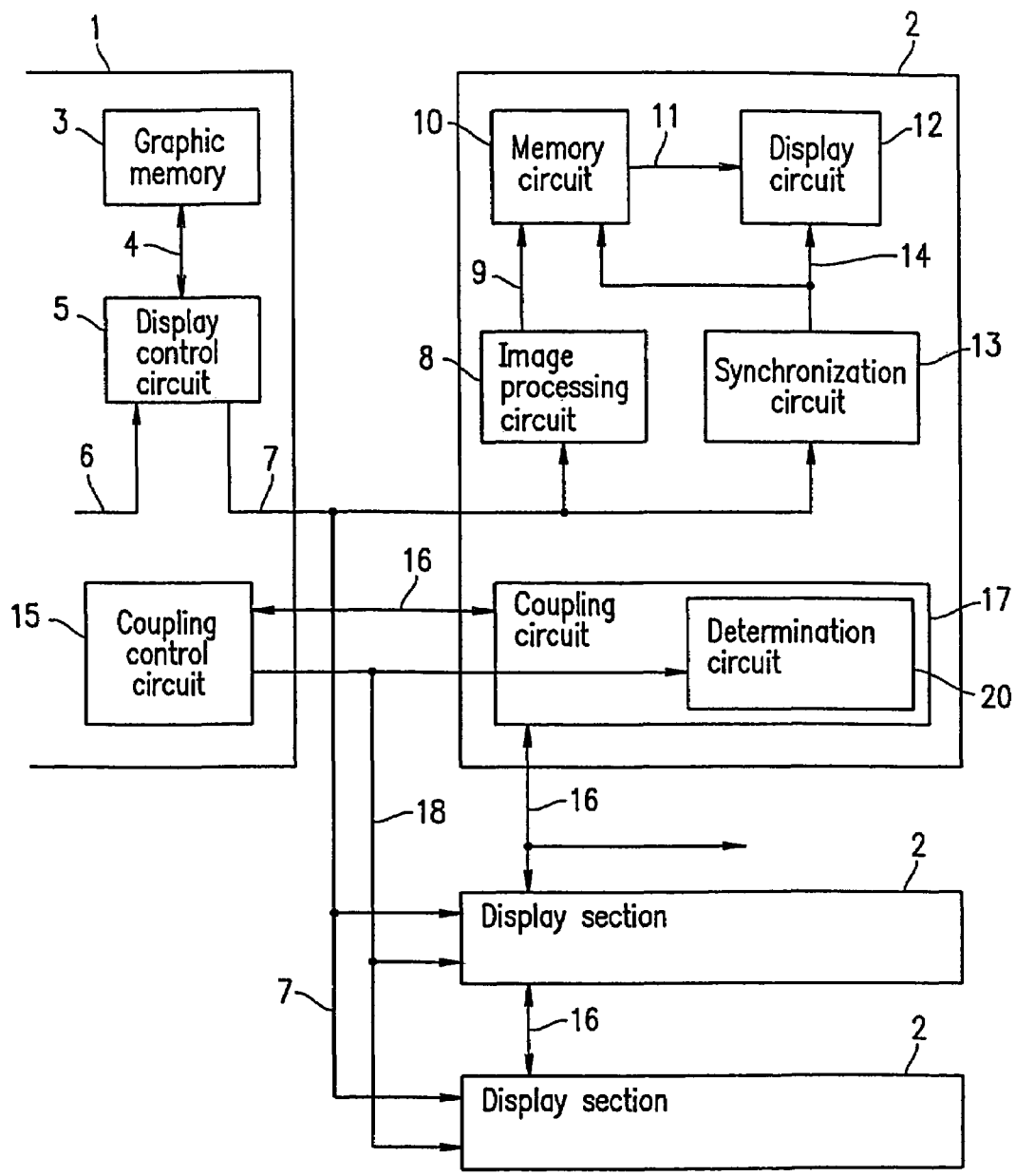
FIG. 1 is a block diagram illustrating an image display system according to Example 1 of the present invention.

FIG. 1 is a block diagram illustrating an image display system according to Example 1 of the present invention. The image display system includes a display controller section 1 serving as a host device (e.g., a personal computer), and drives a plurality of display sections 2 implemented by using display devices such as liquid crystal displays (LCDs).

The display controller section 1 includes a display control circuit 5, which is connected via a system bus 6 to a host system (not shown) that executes various applications. The display control circuit 5 is connected to a graphic memory 3 via a graphic memory bus 4. The display control circuit 5 is also connected to an image processing circuit 8 and a synchronization circuit 13 in the display section 2 via an interface bus 7. Furthermore, the display controller section 1 includes a coupling control circuit 15 for controlling the state of coupling with the respective display sections 2.

Each display section 2 includes an image processing circuit 8 for receiving image data sent from the display control circuit 5 via the interface bus 7. The image processing circuit 8 is connected to a memory circuit 10 for temporarily storing the image data via a write bus 9. The memory circuit 10 is further connected to a display circuit 12 via a read bus 11. The memory circuit 10 is composed of a RAM or the like, e.g., a dynamic RAM. Each display section 2 also includes a coupling circuit 17. The respective coupling circuits 17 of the display sections 2 are cascade-connected via coupling control buses 16, e.g., I$^2$C buses which are known as DDCs (Display Data Channels).

The coupling control circuit 15 in the display controller section 1 and a determination circuit 20 in the coupling circuit 17 of each display section 2 are interconnected via a coupling monitor line 18, which is provided in order to enable reciprocal monitoring according to the present invention.

Next, a flow of image data in the image display system featuring the above-described display device will be described.

First, an image signal which is transmitted from a host system (not shown) is first processed by the display control circuit 5 and the graphic memory 3 in the display controller section 1 serving as a host device, and thereafter is transmitted via the interface bus 7 to the image processing circuit 8.

In the case where each display section 2 is to display general images such as moving pictures, the display controller section 1 transmits to each display section 2 the image signal along with a synchronization signal which is in synchronization with the image signal (refresh operation). The synchronization signal is received by the synchronization circuit 13 in each display section 2. When the synchronization circuit 13 in each display section 2 receives the image signal in synchronization, the synchronization circuit 13 transmits a signal which is in synchronization with the received image signal to the memory circuit 10 and the display circuit 12. While the synchronization signal is being transmitted to the memory circuit 10 and the display circuit 12, the image signal which is received by the image processing circuit 8 is not only written to the memory circuit 10 but also transmitted to the display circuit 12 via image data read bus 11, so that moving pictures are displayed on the display screen in accordance with the image signal received by the display circuit 12.

Once the transmission of the synchronization signal from the display controller section 1 is stopped, the synchronization circuit 13 in each display section 2 determines that the synchronization signal is not being received, and transmits a synchronization signal having a predetermined timing scheme to the memory circuit 10 and the display circuit 12. Once receiving the synchronization signal, the memory circuit 10 stops writing data, and allows the data written therein to be read to the display circuit 12. Based on the image signal thus read, a still image is displayed on the display screen.

A control information signal is exchanged between the coupling control circuit 15 in the display controller section 1 and the coupling circuit 17 in each display section 2 via the coupling control bus 16, whereby the state of coupling of each display section 2 is monitored. The coupling control circuit 15 controls the coupling circuits 17 in the respective display section 2, such that the display screens of all or some of the display sections 2 can together function to display one large image, for example.

Next, power management of each display section 2 will be described.

When the host system is ON, the coupling monitor line 18 which is connected to the display controller section 1 is in an active state. Herein, it is assumed that an active state is represented by a positive potential (5 V), as is commonly practiced in the art. Once the coupling monitor line 18 enters an active state (i.e., a potential of 5 V), the determination circuit 20 in the coupling circuit 17 of each display section 2 detects that the coupling circuit 15 in the display controller section 1 is in an active state, and accordingly turns ON each display section 2.

When the host system is OFF, i.e., when the display controller section 1 is turned OFF, the coupling monitor line 18 is in an inactive state. Herein, it is assumed that an inactive state is represented by a GND potential (0 V), as is commonly practiced in the art. In this state, the determination circuit 20 in the coupling circuit 17 of each display section 2 detects via the coupling monitor line 18 that the coupling control circuit 15 in the display controller section 1 is in an inactive state, and accordingly turns OFF each display section 2. It will be appreciated that appropriate means is provided so as to maintain the coupling circuit 17 in each display section 2 operative even when the display section 2 is turned OFF, because it is necessary for at least the coupling circuit 17 in each display section 2 to be functional in order for each display section 2 to monitor the state of the host system.

If the coupling monitor line 18 interconnecting the display sections 2 somehow fails to couple one display section 2 to another, the coupling monitor line 18 will have a high impedance. By providing a resistor or the like through which to pull the coupling monitor line 18 down to the GND level, information representing an inactive state can be transmitted to any display sections 2 that are provided downstream in the direction of signal transmission, as if an inactive state were detected. As a result, each of the display sections 2 which are provided downstream in the direction of signal transmission are turned OFF.

Each display section 2 determines whether the coupling control circuit 15 in the display controller section 1 is in an active state or an inactive state via the coupling monitor line 18, and each display section 2 is turned OFF if the coupling control circuit 15 is found to be in an inactive state. Thus, it is possible to administer power management for each display section 2 by means of the coupling control circuit 15 in the display controller section 1.

Specifically, by detecting that the coupling monitor line 18 is in an inactive state by means of the coupling control circuit 15 in the display controller section 1, it is possible to know that the host device is OFF, etc. On the other hand, by detecting that a synchronization signal which is transmitted from the host device is not being received by the synchronization circuit 13 in each display section 2, it can be known that the operation must be switched from the regular display function to reading the information which is retained in the memory circuit. As a result, each of the plurality of display section 2 which are connected to the display controller section 1 can administer its own power management.

The coupling monitor line 18 may be connected in parallel or in series to the display sections 2, or in any other manner. The signals to be transmitted through the coupling monitor line 18 may be electric signals, optical signals, electromagnetic signals, or any other signal media.

EXAMPLE 2

Figure 2:
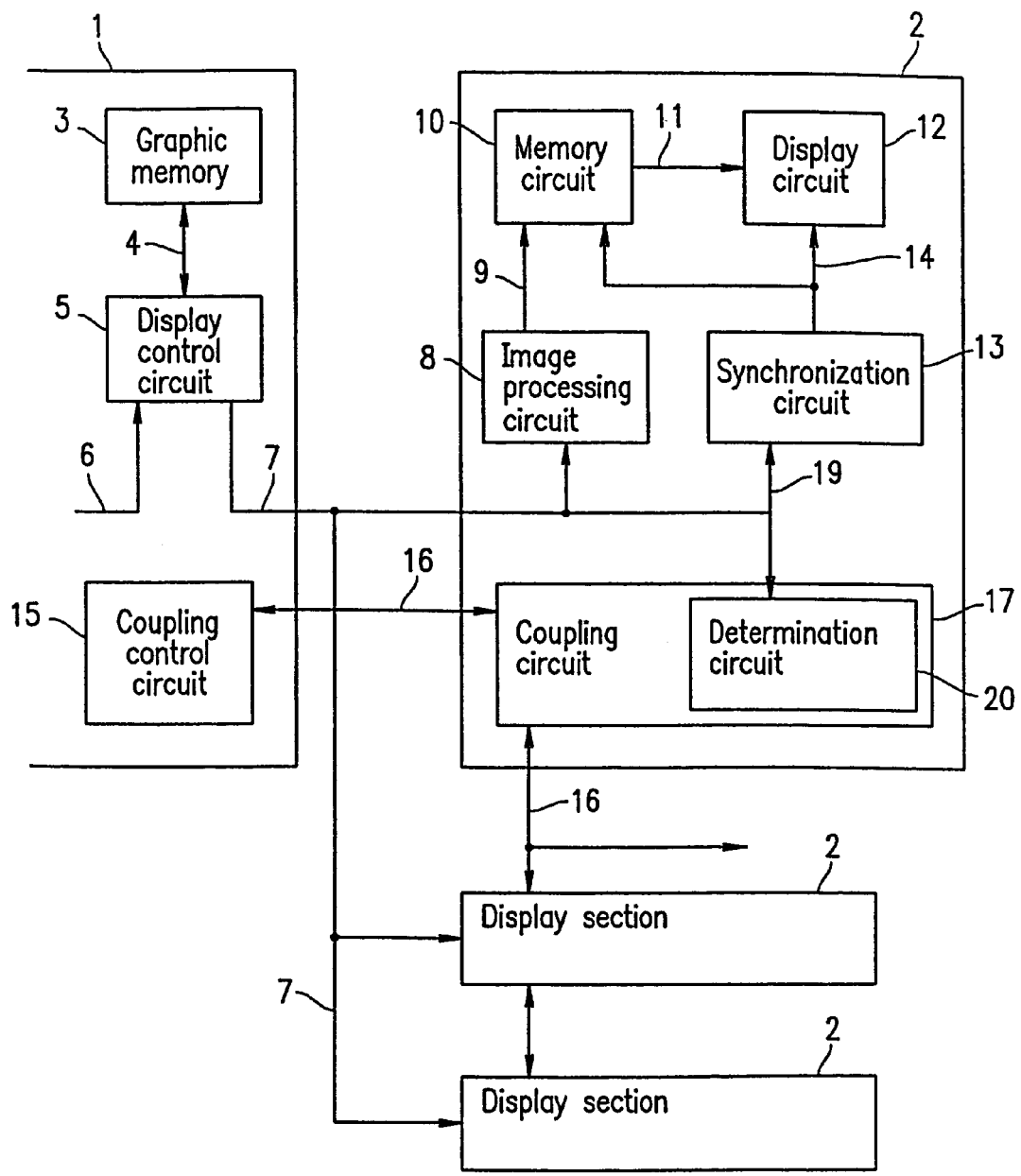
FIG. 2 is a block diagram illustrating an image display system according to Example 2 of the present invention.
Figure 3:
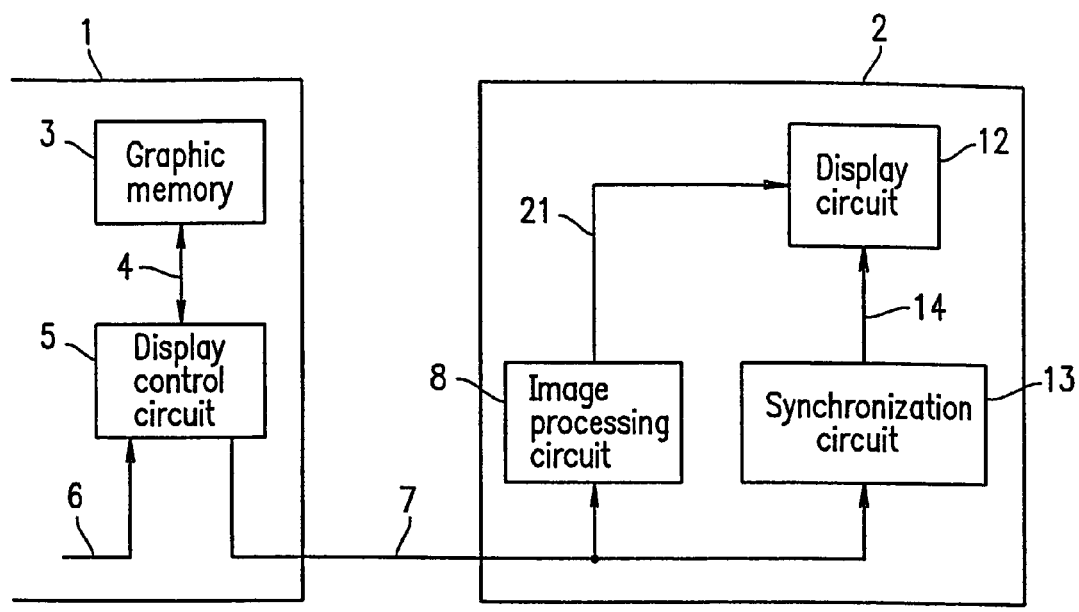
FIG. 3 is a block diagram illustrating a conventional image display system.
Figure 4:
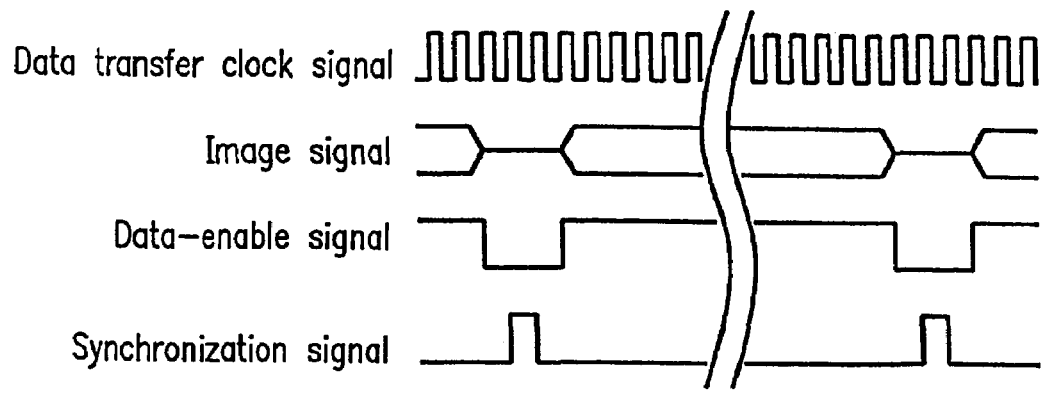
FIG. 4 is a waveform diagram showing various signals transmitted through an interface bus.

FIG. 2 is a block diagram illustrating an image display system according to Example 2 of the present invention.

The image display system according to the present example of the invention is identical to the image display system according to Example 1 (shown in FIG. 1) except for some differences. Hereinafter, the differences from the image display system according to Example 1 will be specifically described.

In the image display system shown in FIG. 2, a determination circuit 20 is provided in a coupling circuit 17 of each display section 2. The determination circuit 20 is connected to a display control circuit 5 in a display controller section 1 via an interface bus 7.

The coupling monitor line 18 which was employed in Example 1 is not provided in the image display system according to Example 2 of the present invention.

Figure 5:
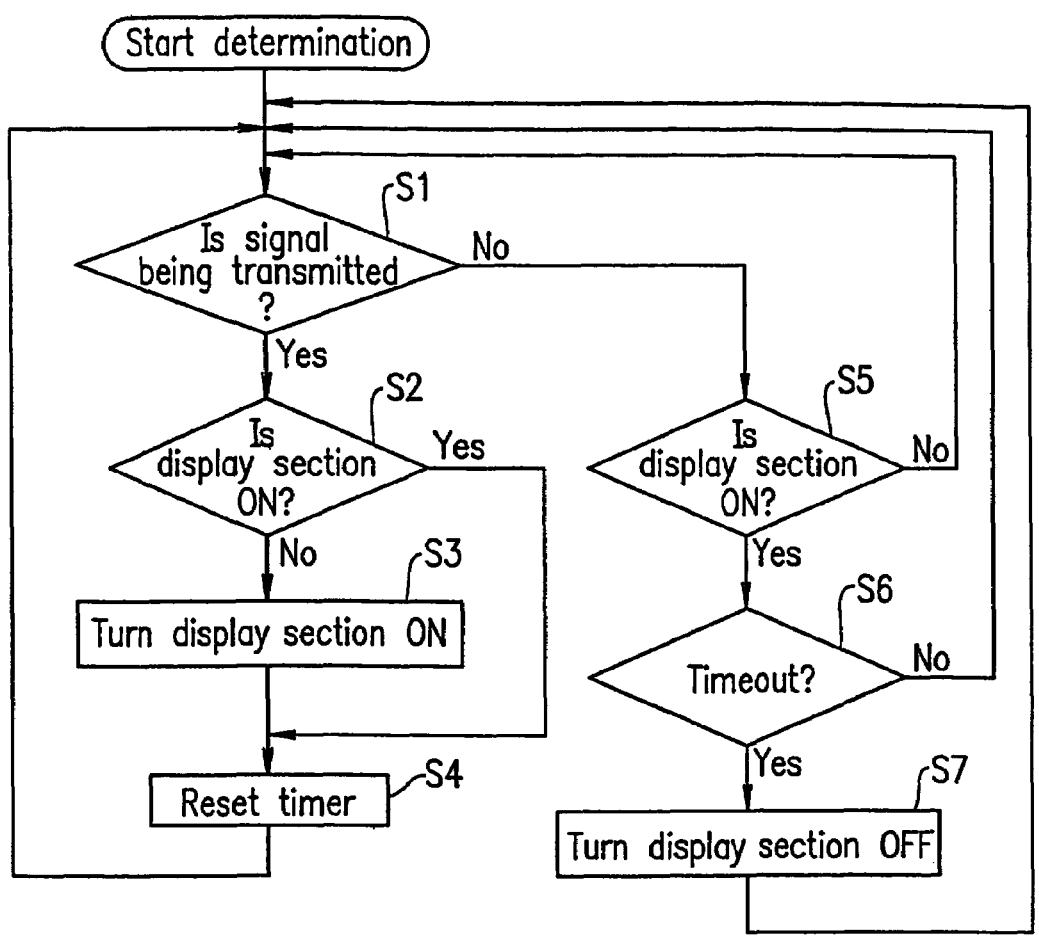
FIG. 5 is a flowchart illustrating a flow of process of data-enable signal determination performed by a determination circuit in a variant of an image display system according to Example 2 of the present invention.

When transmitting an image signal from the display control circuit 5 via the interface bus 7 to an image processing circuit 8 and a synchronization circuit 13 in each display section 2, the display controller section 1 transmits a data-enable signal representing a period during which data is valid or enabled. The determination circuit 20 constantly monitors this data-enable signal, and upon determining that the data-enable signal is not being transmitted, determines that the host system is OFF and thus the display controller section 1 is OFF. Thus, it is possible to determine by means of the determination circuit 20 in each display section 2 that the display controller section 1 is OFF, or inactivated, whereby each display section 2 can administer its own power management. The determination circuit 20 does not need to constantly monitor the data-enable signal; rather, the determination circuit 20 may be arranged so as to monitor the data-enable signal during arbitrary-selected periods. A flowchart of FIG. 5 illustrates a flow of the data-enable signal determination process performed by the determination circuit 20 under such arrangement. In this case, it is assumed that the determination circuit 20 includes a timer (not shown) for setting a period during which to monitor the data-enable signal.

The operation of the aforementioned determination circuit 20 will be described with reference to FIG. 5.

In Step S1, the determination circuit 20 determines whether or not the data-enable signal is being transmitted. If the data-enable signal is detected, it is determined that the display controller section 1 is active, and the process proceeds to Step S2, where it is determined whether or not the display section 2 is ON. If it is determined in Step S2 that the display section 2 is OFF, the process proceeds to Step S3, where the display section 2 is turned ON, and the process further proceeds to Step S4. If it is determined in Step S2 that the display section 2 is ON, the process also proceeds to Step S4. The timer flow is reset in Step S4, and the process returns to Step S1 to determine whether or not the data-enable signal is being transmitted. If the data-enable signal is not detected in Step S1, it is determined that the display controller section 1 is inactive, and the process proceeds to Step S5. In Step S5, it is determined whether or not the display section 2 is ON. If it is determined that the display section 2 is OFF, the process proceeds again returns to Step S1 to determine whether or not the data-enable signal is being transmitted. If it is determined that the display section 2 is ON, the process proceeds to Step S6. In Step S6, it is determined whether or not a timeout period has expired by checking the counting of the timer. If the timeout period has not been expired, the process again returns to Step S1 to determine whether or not the data-enable signal is being transmitted. If a timeout signal from the timer is detected in Step S6, it is determined that the display controller section 1 is inactive and the process proceeds to Step S7, where the display section 2 is turned OFF. The process again returns to Step S1 to determine whether or not the data-enable signal is being transmitted.

Thus, when it is determined in each display section 2 that no access is being made from the display controller section 1, the display section 2 can administer its own power management.

Figure 6:
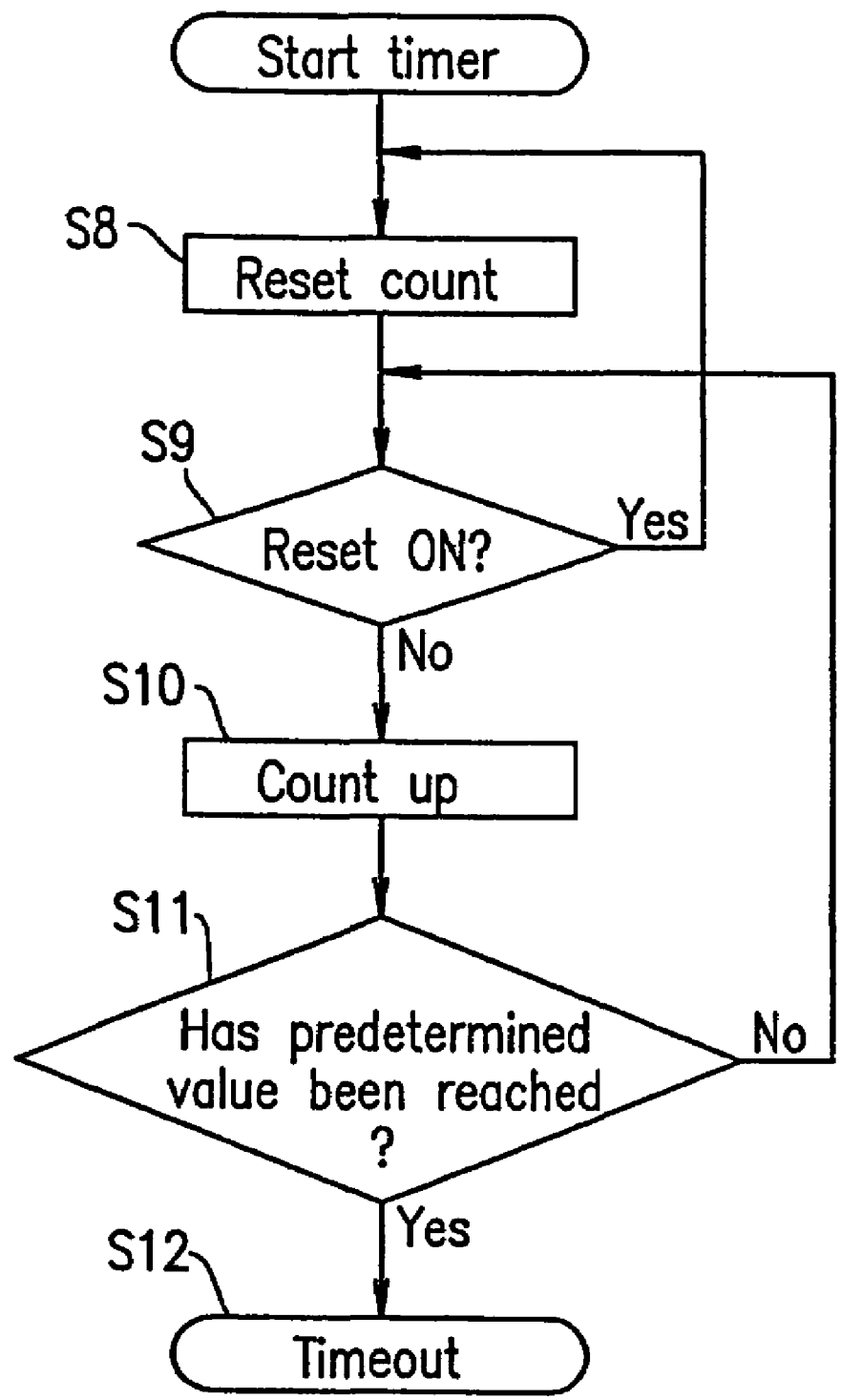
FIG. 6 is a flowchart illustrating a scheme employed for a timer in a variant of a determination circuit in an image display system according to Example 2 of the present invention.

FIG. 6 is a flowchart illustrating a scheme employed for a timer in the determination circuit 20.

When the display section 2 is turned ON, the timer is activated and its count value is reset (Step S8). The process proceeds to Step S9, where it is determined whether or not the timer is being reset by the data-enable signal determination process performed by the determination circuit 20. If it is determined that the timer is not reset, i.e., the timer is released, the process proceeds to Step 10, where the timer begins counting up. Thereafter, when it is determined in Step S11 that the count value has reached a predetermined value, the process proceeds to Step S12, where a timeout signal is output.

EXAMPLE 3

Instead of the data-enable signal, a data transfer clock signal may be monitored by the determination circuit 20 illustrated in Example 2.

Thus, the determination circuit 20 monitors the data transfer clock signal, and upon determining that the data transfer clock signal is not being transmitted, determines that the host system is OFF and thus the display controller section 1 is OFF. Thus, it is possible to determine by means of the determination circuit 20 in each display section 2 that the display controller section 1 is OFF, i.e., inactivated, whereby the display section 2 can administer its own power management. The determination circuit 20 does not need to constantly monitor the data transfer clock signal; rather, the determination circuit 20 may be arranged so as to monitor the data transfer clock signal during arbitrary-selected periods.

EXAMPLE 4

Figure 7:
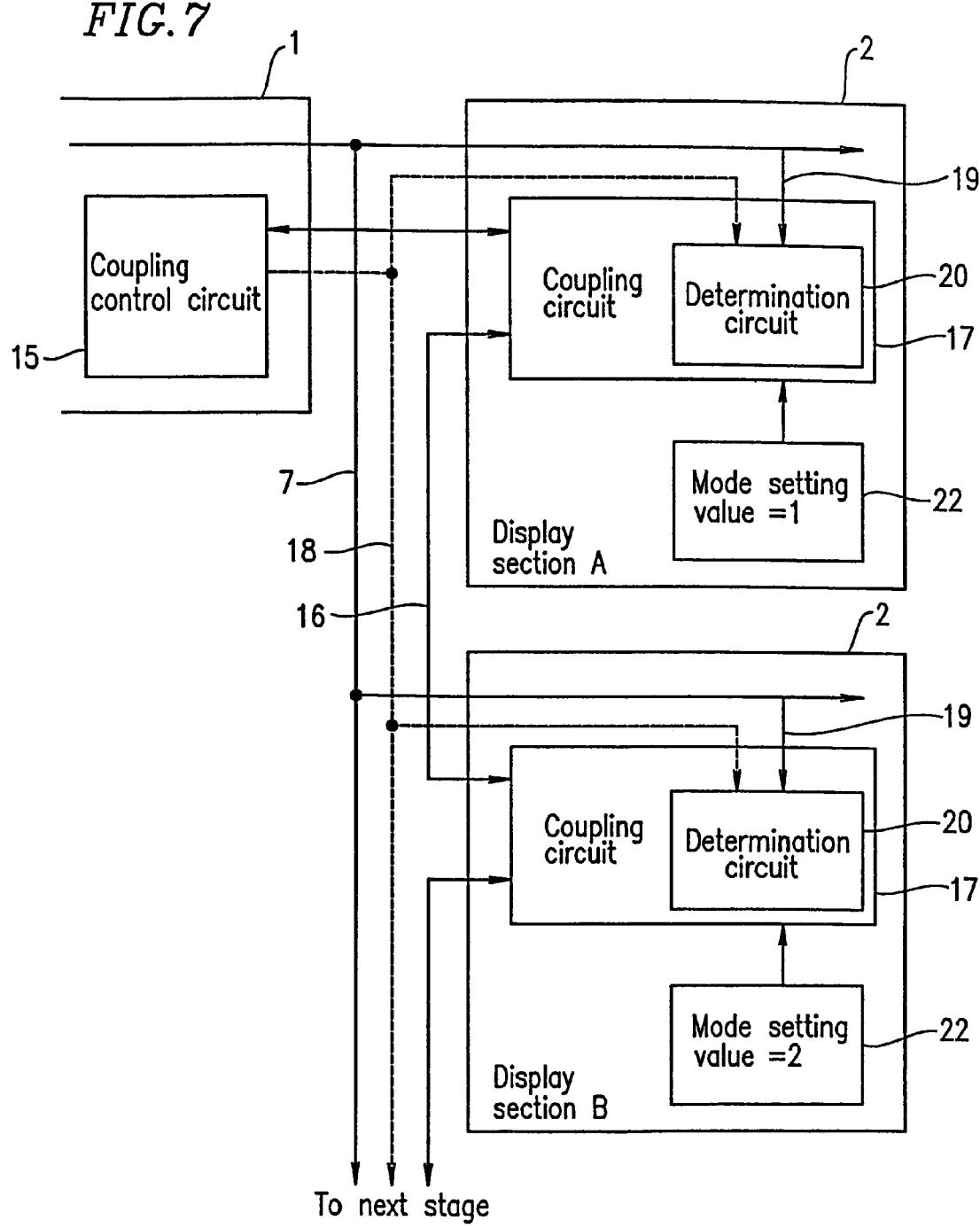
FIG. 7 is a block diagram illustrating an image display system according to Example 4 of the present invention.

FIG. 7 is a block diagram illustrating an image display system according to Example 4 of the present invention.

The image display system shown in FIG. 7 is characterized by a mode setting value 22 which is provided in each display section 2. The setting value 22 may be arranged so as to be freely selectable by means of a selection switch, or any other setting method may be used, e.g., the setting value 22 may be previously stored in a memory means.

For the purpose of explanation, it is assumed that the mode setting value 22 can be set to one of the three following values:

setting value=1: the display section 2 is to be turned OFF when the host is turned OFF;

setting value=2: the display section 2 is not to be turned OFF when the host is turned OFF, thereby allowing the display section 2 to continue displaying; or setting value=3: the backlight is turned OFF so as to discontinue displaying without turning the display section 2 OFF.

It is further assumed that the mode setting value 22 of the display section A in FIG. 7 is set to "1" and that the mode setting value 22 of the display section B in FIG. 7 is set to "2". When each display section determines that the host is OFF according to the principles described in Example 1, 2, or 3, the display section A will be turned OFF, whereas the display section B will not be turned OFF but will continue displaying, in accordance with the mode setting value 22 therein. Thus, a display device which can administer its own power management can be realized.

As described above, according to the present invention, a state of coupling with a host device is monitored on the basis of a display signal. Therefore, a display section can independently administer its own power management even if the display section is of a type which may, when the transmission of a synchronization signal is interrupted, stop writing to a frame memory thereof and instead perform display while reading the information which is retained in the frame memory. As a result, in the case where a plurality of devices are connected to a host device, each display device can administer its own power management.

According to Example 2 or 3, a data-enable signal or a data transfer clock signal, which may already be used within the system, can be conveniently utilized to attain the same effect as that of Example 1, without the need to provide any additional interfacing means for monitoring the coupling between a host and the display sections. This feature can be realized without employing any additional circuitry on the host side. Rather, the host side can be implemented by using conventional equipment alone. As a result, any increase in the overhead associated with the interfacing means with the host device is prevented even when a plurality of monitor displays are connected to equipment which has otherwise been dedicated to a single monitor display.

According to Example 4 of the present invention, a display device can administer its own power management according to a previously determined program.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image display system comprising at least one display device connected to a host device, wherein:

an image is displayed on the at least one display device in accordance with an image signal and a first signal which is output from the host device, said first signal being a synchronization signal; and the at least one display device monitors a state of coupling with the host device based on one of a data enable signal and a data transfer clock signal, wherein the at least one display device manages power based on the state of coupling.

2. An image display system according to claim 1, wherein the at least one display device monitors the state of coupling with the host device based on a voltage level provided by the host device.

3. An image display system according to claim 1, wherein:

the at least one display device comprises a plurality of display devices, the plurality of display devices being interconnected to one another; and each of the plurality of display devices monitors a state of coupling with at least one of the other display devices.

4. An image display system comprising at least one display device connected to a host device, wherein:

an image is displayed on the at least one display device in accordance with an image signal which is output from the host device; and the at least one display device determines a state of coupling with the host device based on a data-enable signal which is output from the host device, wherein the at least one display device manages power based on the state of coupling.

5. An image display system comprising at least one display device connected to a host device, wherein:

an image is displayed on the at least one display device in accordance with an image signal which is output from the host device; and the at least one display device determines a state of coupling with the host device based on a data transfer clock signal which is output from the host device, wherein the at least one display device manages power based on the state of coupling.

6. An image display system according to claim 4, wherein the state of coupling with the host device is constantly monitored.

7. An image display system according to claim 5, wherein the state of coupling with the host device is constantly monitored.

8. An image display system according to claim 4, wherein the state of coupling with the host device is monitored during a period which is set by means of a timer.

9. An image display system according to claim 5, wherein the state of coupling with the host device is monitored during a period which is set by means of a timer.

10. A display device connected to a host device, the display device displaying an image in accordance with an image signal and a first signal which is output from the host device, said first signal being a synchronization signal, wherein the display device monitors a state of coupling with the host device based on one of a data enable signal and a data transfer clock signal, wherein the at least one display device manages power based on the state of coupling.

11. A display device for use in an image display system comprising at least one display device connected to a host device, wherein an image is displayed on the display device in accordance with an image signal which is output from the host device, wherein the display device determines a state of coupling with the host device based on a data-enable signal which is output from the host device, wherein the at least one display device manages power based on the state of coupling.

12. A display device for use in an image display system comprising at least one display device connected to a host device, wherein an image is displayed on the display device in accordance with an image signal which is output from the host device, wherein the display device determines a state of coupling with the host device based on a data transfer clock signal which is output from the host device, wherein the at least one display device manages power based on the state of coupling.

13. An image display system according to claim 1, wherein when the coupling with the host device is cancelled, each of the at least one display device independently administers power management thereof based on a prescribed setting.

14. An image display system according to claim 4, wherein when the coupling with the host device is cancelled, each of the at least one display device independently administers power management thereof based on a prescribed setting.

15. An image display system according to claim 5, wherein when the coupling with the host device is cancelled, each of the at least one display device independently administers power management thereof based on a prescribed setting.

16. A display device according to claim 10, wherein when the coupling with the host device is cancelled, the display device independently administers power management thereof based on a prescribed setting.

17. A display device according to claim 11, wherein when the coupling with the host device is cancelled, the display device independently administers power management thereof based on a prescribed setting.

18. A display device according to claim 12, wherein when the coupling with the host device is cancelled, the display device independently administers power management thereof based on a prescribed setting.

19. The image display system of claim 1, wherein the display device is a liquid crystal display.

20. The image display system of claim 1, wherein the state of coupling with the host device provides information to distinguish an off state of the host device and the absence of the first signal from the host device.

21. The system of claim 1, wherein the at least one display device monitors a state of coupling with the host device based on a control information signal exchanged between the at least one display device and the host device.

* * * * *